United States Patent Office 3,743,698
Patented July 3, 1973

---

3,743,698
PROCESS FOR MANUFACTURING BORON HALIDES
Gunter Kratel and Georg Vogt, Sankt Mang, Bavaria, Germany, assignors to Elektroschmelzwerk Kempten G.m.b.H., Munich, Bavaria, Germany
No Drawing. Filed Nov. 13, 1970, Ser. No. 89,479
Claims priority, application Germany, Nov. 18, 1969, P 19 57 949.8
Int. Cl. C01c *9/00*
U.S. Cl. 423—292       5 Claims

ABSTRACT OF THE DISCLOSURE

A process for manufacturing boron halides which comprises reacting a mixture of boron carbide or its constituent elements, and a boride of a metal of the first, second or third main groups of the Periodic System, with a halogen.

---

It is known to produce boron halides according to the Oersted process, by reacting a halogen with a mixture of carbon and boron oxide, or with a mixture of carbon and boron oxygen compounds. This reaction takes place endothermically and therefore requires a supply of energy. Furthermore, it is very difficult to control this reaction. In addition, the yield referred to the halogen, or also to the boron compounds, is poor, since the reaction temperature lies above the fusion point of the boron compound. As a result the mixture agglomerates into a solid mass or a large lump and passage of the halogen through the layer to be halogenated is prevented. Phosgene is obtained as a by-product, whose toxicity is known. Further, phosgene and boron trichloride are very hard to separate, inasmuch as the condensation temperatures lie close to each other.

It is also known to produce boron halides by reacting boron carbide with a halogen. Although this is an exothermic reaction, the heat energy released does not suffice to maintain the reaction temperature of more than 1000° C. It is therefore necessary with such process to provide additional energy by means of a heating system. The yields, referred to the boron carbide, are poor since the latter, like silicon carbide, during the reaction with halogen, surrounds itself with an impermeable carbon layer, through the released carbon. Because of the high reaction temperature, at times an agglomeration of the boron carbide occurs, which causes clogging inside the reaction oven.

We have now discovered a process for manufacturing boron halides which is characterized by the fact that boron carbide and/or its initial constitutents, in admixture with borides of the first, second and third main groups of the Periodic System are brought to reaction with a halogen. Here the reaction is so strongly exothermic that the supplying of additional energy is superfluous.

The effect of the borides is especially surprising as the reaction-obstructing graphite layer ordinarily occurring during the reaction of boron carbide with halogen is almost eliminated. Furthermore it is possible, with the use of the borides of the first to third main groups of the Periodic System, to start the reaction at as low as 300° C., while with boron carbide without additive, the conversion starts only with temperatures above 1000° C.

With combinations of 50 to 97 percent by weight boron carbide and/or a mixture of boron oxygen compounds and carbon with 3 to 50, preferably 5 to 15 percent by weight, related to the total quantity of boron carbide, of borides of the first, second and third main groups of the Periodic System, e.g. calcium boride and a halogen, the reaction takes place with surprising speed, without the supply of energy.

The process for manufacturing boron halides according to this invention, can also be carried out with boron oxygen compounds together with carbon in admixture with borides. In this case the boride acts as an energy carrier.

A fused mixture of borides and boron carbide can also be used. Such mixtures consist preferably of boron, carbon and calcium in the following weight percentages: boron 65–78%, carbon 5–18% and calcium 30–8%. These mixtures may also be made, for instance, of colemanite, carbon, and boric acid.

Pursuant to the invention, all borides of the first, second and third main groups can be used as borides, especially however calcium and aluminum borides. Here it becomes apparent that the effect of the borides increases from the third main group to the first main group.

With the process of the invention, the reaction takes place in the temperature range from 300 to 1800° C., preferably however between 800 and 1200° C. The temperature may be controlled by, depending on the quantity passed through, changing the addition of the borides.

Chlorine, bromine and iodine are mainly of interest as halogens. Within this group, the reaction propensity drops from the chlorine to iodine. With greater addition of borides, chlorine may react so violently that additional cooling may be called for.

The reaction can be carried out in a reaction furnace in stationary or flowing condition (stationary or fluid bed) or in a whirling vortex bed. As reaction residue there remains mostly only carbon and smaller quantities of the halogen salts of the elements of the first to the third main group of the Periodic System, so that the removal of the reaction residues from the reaction system is very easily achieved. With the reaction in the whirling bed, the carbon is carried from the reaction furnace together with the created reaction gases.

The initial elements to be halogenated are best placed in the reaction oven in mixture with granules measuring from 0.1 to 15 mm. Small granules, i.e. dust, are ejected from the reactor together with the reaction gases. This difficulty is prevented if the granules of less than 0.1 mm. are pelletized and thus become usable for the reaction. It is preferable to make a mixture of the borides, boron carbides or boron oxygen compounds and to pelletize same.

A special advantage of the process of this invention resides in the fact that the boron halides obtained are very pure.

EXAMPLE 1

200 g. boron carbide and 20 g. calcium boride in granules from 2 to 5 mm. are mixed, and in a vertical quartz tube 300 mm. long and 30 mm. in diameter are brought to reaction with 1 kg./h. chlorine. The reaction takes place at a temperature of 900 to 1050° C. without the supply of energy. The colorless boron trichloride obtained is condensed after the oven. The condensed mass contains 99.9% boron trichloride.

EXAMPLE 2

200 g. boron carbide and 60 g. calcium boride in granules from 2 to 5 mm. are brought to reaction as per Example 1, with 1.3 kg./h. bromine. The reaction temperature lies between 950 and 1100° C. The condensed mass contains 99.9% boron tribromide.

EXAMPLE 3

50 g. boron carbide and 50 g. calcium boride in granules from 2 to 5 mm. are brought to reaction as per Example 1, with 1.05 kg./h. of iodine. The reaction temperatures lie between 1000° C. and 1200° C. The condensed mass obtained contains 98.5% boron tri-iodide.

EXAMPLE 4

A mixture of 100 g. calcium boride and 100 g. of an initial mixture for the manufacture of boron carbide consisting of 3.5 parts boric acid and one part carbon, are brought to reaction with 0.8 kg./h. chlorine as per Example 1, with reaction temperatures from 1000° C. to 1200° C. The condensed mass contains 99% boron trichloride.

The invention claimed is:

1. A process for manufacturing a boron halide selected from the group consisting of a chloride, a bromide, and an iodide, which comprises reacting
   (A) 50–97 percent by weight of boron carbide, and
   (B) 3–50 percent by weight calculated on the total amount of (A) of a metal boride selected from the group consisting of calcium boride and aluminum boride, with
   (C) a halogen selected from the group consisting of chlorine, bromine and iodine,
   (D) at a temperature between about 300° and about 1800° C., and
   (E) recovering the resulting boron halide.

2. Process according to claim 1, in which the boride is selected from the group consisting of calcium boride.

3. Process according to claim 1, in which the mixed substances involved in the reaction with said halogen are in the form of granules measuring from 0.1 to 15 mm.

4. The process as recited in claim 1, in which the amount of (B) is from 5–15 percent by weight of the total amount of (A).

5. The process as recited in claim 1, in which the reaction is performed at a temperature of 800° C.–1200° C., the temperature being controlled by the amount of borides added taking part in the reaction.

References Cited

UNITED STATES PATENTS

| | | | | |
|---|---|---|---|---|
| 3,019,089 | 1/1962 | O'Hara | | 23—205 |
| 2,805,130 | 9/1957 | Wood | | 23—205 |

OSCAR R. VERTIZ, Primary Examiner

G. ALVARO, Assistant Examiner